(12) United States Patent
Yamada et al.

(10) Patent No.: US 7,581,128 B2
(45) Date of Patent: Aug. 25, 2009

(54) MICROCOMPUTER SELECTING OPERATING CONDITION

(75) Inventors: Kenji Yamada, Nukata-gun (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 492 days.

(21) Appl. No.: 11/357,166

(22) Filed: Feb. 21, 2006

(65) Prior Publication Data
US 2006/0206746 A1 Sep. 14, 2006

(30) Foreign Application Priority Data
Mar. 8, 2005 (JP) ............................. 2005-063907

(51) Int. Cl.
*G06F 1/00* (2006.01)
(52) U.S. Cl. ................. 713/323; 713/322; 361/103; 327/141
(58) Field of Classification Search ............ 713/323, 713/322; 327/141; 361/103
See application file for complete search history.

(56) References Cited

U.S. PATENT DOCUMENTS

| | | | |
|---|---|---|---|
| 5,483,471 A | 1/1996 | Adachi | |
| 5,546,568 A * | 8/1996 | Bland et al. | 713/501 |
| 5,778,237 A * | 7/1998 | Yamamoto et al. | 713/322 |
| 5,822,572 A * | 10/1998 | Kawaguchi | 713/501 |
| 5,996,084 A * | 11/1999 | Watts | 713/323 |
| 6,404,610 B1 * | 6/2002 | Chang | 361/103 |
| 6,804,793 B2 * | 10/2004 | Josephson et al. | 713/501 |
| 7,100,061 B2 * | 8/2006 | Halepete et al. | 713/322 |
| 2003/0154230 A1 * | 8/2003 | Harada et al. | 708/801 |
| 2004/0017234 A1 * | 1/2004 | Tam et al. | 327/141 |
| 2004/0044914 A1 * | 3/2004 | Gedeon | 713/300 |
| 2006/0020838 A1 * | 1/2006 | Tschanz et al. | 713/322 |
| 2006/0103996 A1 * | 5/2006 | Carroll et al. | 361/90 |

* cited by examiner

*Primary Examiner*—Thomas Lee
*Assistant Examiner*—Vincent T Tran
(74) *Attorney, Agent, or Firm*—Posz Law Group, PLC

(57) ABSTRACT

A microcomputer includes a CPU, a program memory for storing a subroutine program, peripheral circuits, a clock circuit, and a voltage drop detection circuit. When the voltage drop detection circuit detects the voltage drop at the end of a power line, a frequency of a clock signal provided through the clock circuit to the CPU is divided down and a supply of a clock signal provided to the peripheral circuits is stopped. The CPU executes the subroutine program, thereby resuming the supply of the clock signal provided to the peripheral circuits.

1 Claim, 15 Drawing Sheets

MICROCOMPUTER SELECTING OPERATING CONDITION

CROSS REFERENCE TO RELATED APPLICATION

This application is based on and incorporates herein by reference Japanese Patent Application No. 2005-63907 filed on Mar. 8, 2005.

TECHNICAL FIELD

The technical field relates to a microcomputer.

BACKGROUND

In an integrated circuit device such as a microcomputer, when a power supply voltage falls below a predetermined level that ensures a proper operation of the microcomputer, the microcomputer is temporarily forced into a reset state. This approach prevents the microcomputer from operating improperly.

In general, the microcomputer is held in the reset state until the power supply voltage returns to a normal level. However, if the microcomputer is used for equipment requiring high safety, it is recommended that a time period during which the microcomputer stops its operation be as short as possible.

FIG. 20 is a circuit diagram of a microcomputer 1 disclosed in JP-A-7-56885. The microcomputer 1 includes a central processing unit (CPU) 2, a read-only memory (ROM) 3, and a peripheral circuit 4 that are connected to one another through an address bus 5 for transmission and reception of an address signal and a data bus 6 for transmission and reception of a data signal.

The CPU 2 has a clock oscillator circuit 2a for generating a system clock and a clock control circuit 2b. The system clock generated by the clock oscillator circuit 2a is supplied to the ROM 3 and the peripheral circuit 4 through the clock control circuit 2b.

The ROM 3 has a sense amplifier circuit 7 and a judgement circuit 8 that are used for monitoring the power supply voltage. The sense amplifier circuit 7 and the judgement circuit 8 output a control signal to the clock control circuit 2b when detecting that the power supply voltage drops below a predetermined level. Then, the clock circuit 2b reduces a frequency of the system clock so that a margin of an operation speed can be ensured.

In the microcomputer 1 disclosed in JP-A-7-56885, the ROM 3 monitors the power supply voltage. The power supply voltage may decrease with distance from a power source due to a voltage drop caused by resistance of a power line. Therefore, a voltage appearing at the end portion of the power line may be smaller than the voltage monitored by the ROM 3. Therefore, for example, the peripheral circuit 4 may be rendered inoperable due to an insufficient voltage, because the peripheral circuit 4 is disposed at the end portion of the power line.

Further, in the microcomputer 1, the clock frequency is evenly reduced when the drop in the power supply voltage is detected. However, a peripheral circuit such as a communication circuit may need a full clock speed and may perform no function at a reduced clock speed.

SUMMARY

In view of the above-described problem, it is an object to provide a microcomputer in which even after a drop in a power supply voltage, it is possible to keep an operation of a circuit disposed at the end potion of a power line and to flexibly select an operation condition of a peripheral circuit.

A microcomputer includes a central processing unit (CPU), a program memory for storing a control program executed by the CPU, multiple peripheral circuits for implementing a predetermined function, a clock control circuit for controlling a clock signal provided to the CPU and the peripheral circuits, and a voltage drop detection circuit for detecting a drop in voltage of a power source below a predetermined level.

The program memory further stores a subroutine program for causing the CPU to execute a clock control process. The voltage drop detection circuit is disposed at an end portion of a power line.

When the voltage drop detection circuit detects the drop in the voltage below the predetermined level, the clock control circuit divides down a frequency of the clock signal provided to the CPU and the CPU executes the subroutine program. Then, the CPU selectively stops or divides down the clock signal provided to the peripheral circuits based on the subroutine program.

Thus, when the drop in the voltage is detected, the clock signal provided to the CPU is divided down so that power consumption can be reduced. Further, the clock signal provided to the peripheral circuits are selectively stopped or divided down so that power consumption can be reduced and operative conditions of the peripheral circuits can be selected in accordance with functions of the peripheral circuits. Further, it is possible to maintain a circuit disposed at the end portion of the power line in operable condition, because the power supply voltage is monitored by the voltage drop detection circuit disposed at the end portion of the power line.

BRIEF DESCRIPTION OF THE DRAWINGS

The above and other objectives, features and advantages will become more apparent from the following detailed description made with reference to the accompanying drawings. In the drawings.

DETAILED DESCRIPTION OF THE PREFERRED EMBODIMENTS

First Embodiment

Figure 1:
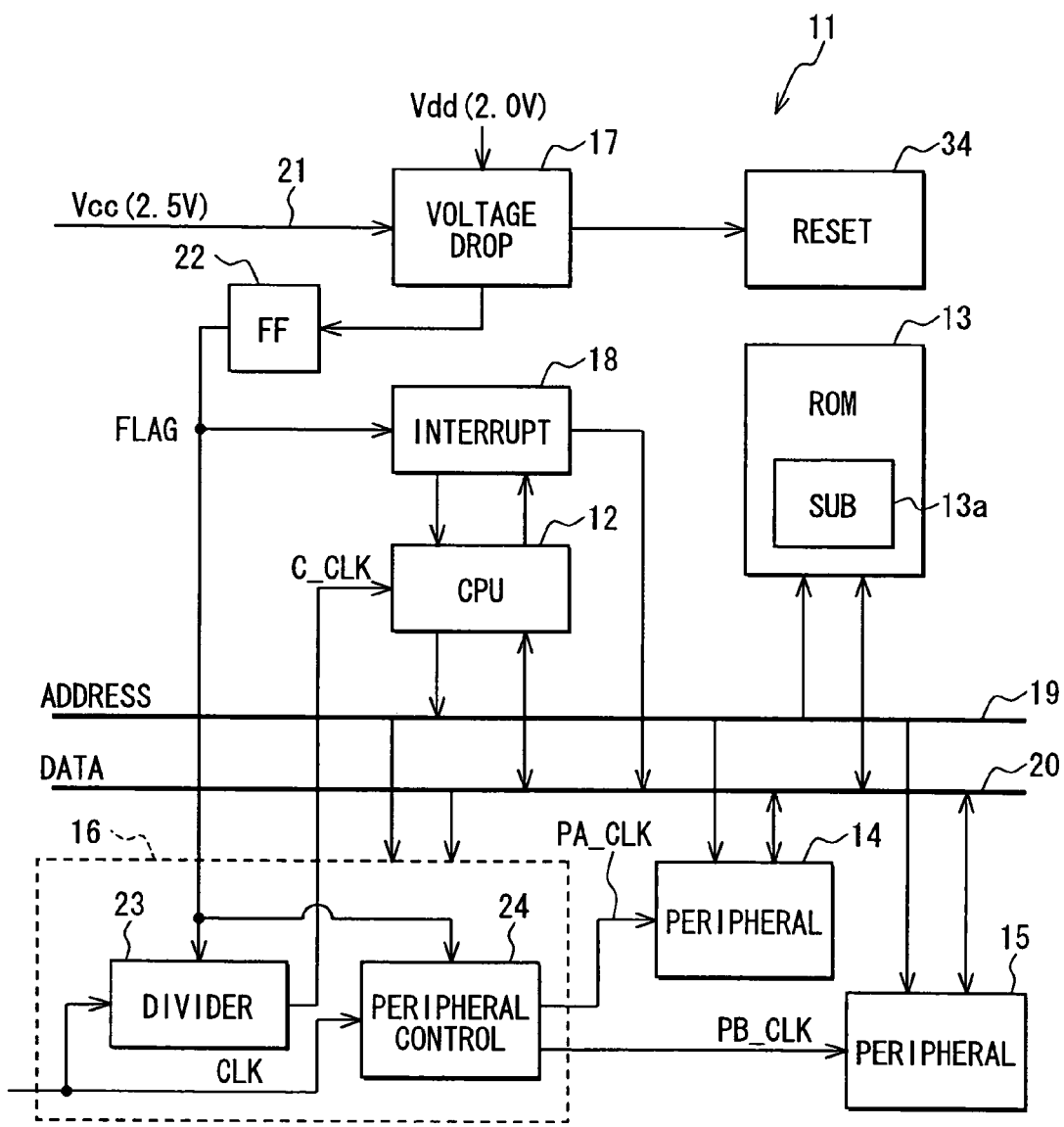
FIG. 1 is a circuit diagram of a microcomputer according to a first embodiment.

Reference is made to FIG. 1, which shows a circuit diagram of a microcomputer 11 used for, for example, a vehicular electronic control unit (ECU).

The microcomputer 11 includes a CPU 12, a ROM (program memory) 13, peripheral circuits 14, 15, a clock circuit (clock control circuit) 16, a voltage drop detection circuit 17, and an interrupt control circuit 18. These components except the voltage drop detection circuit 17 are connected to one another through an address bus 19 and a data bus 20.

A power supply voltage Vcc is provided to the microcomputer 11 through a power line 21. The voltage drop detection circuit 17 is disposed at the end portion of the power line 21 and monitors the power supply voltage Vcc. When the power supply voltage Vcc drops below a reference voltage Vdd, the voltage drop detection circuit 17 outputs a voltage drop detection signal (high active) as a voltage drop detection flag. For example, when a minimum voltage required for transistor level operation is 1.25 V, the power supply voltage Vcc is set to 2.5 V and the reference voltage is set to 2.0 V. The voltage drop detection flag is provided to the clock circuit 16 and the interrupt control circuit 18 after being clock-synchronized by a flip-flop 22.

The ROM 13 stores a control program executed by the CPU 12. The control program includes a subroutine program 13a. The CPU 12 executes the subroutine program 13a when the voltage drop detection circuit 17 detects the drop in the power supply voltage Vcc.

The clock circuit 16 has a clock divider circuit 23 and a peripheral clock control circuit 24. An internal or external oscillator (not shown) provides a clock signal CLK to the clock circuit 16. For example, the clock signal CLK has a frequency of 16 MHz.

The peripheral circuit 14 is a communication circuit used for, for example, a controller area network (CAN), which is a kind of an in-vehicle local area network (LAN). The peripheral circuit 15 is a pulse-width modulation (PWM) signal generation circuit for generating a PWM signal having a pulse width controlled by the CPU 12. The peripheral circuit 15 has a divider circuit for dividing a clock signal by a predetermined frequency division ratio that is set by the CPU 12. The divided clock signal is used as a carrier of the PWM signal.

The interrupt control circuit 18 controls an interrupt to the CPU 12. When the voltage drop detection circuit 17 or other interrupt sources (not shown) requests the interrupt, the interrupt control circuit 18 outputs an interrupt request signal to the CPU 12. Then, when the CPU 12 returns an interrupt enable signal to the interrupt control circuit 18, the interrupt control circuit 18 sends an interrupt vector corresponding to the interrupt request to the CPU 12.

Figure 2:
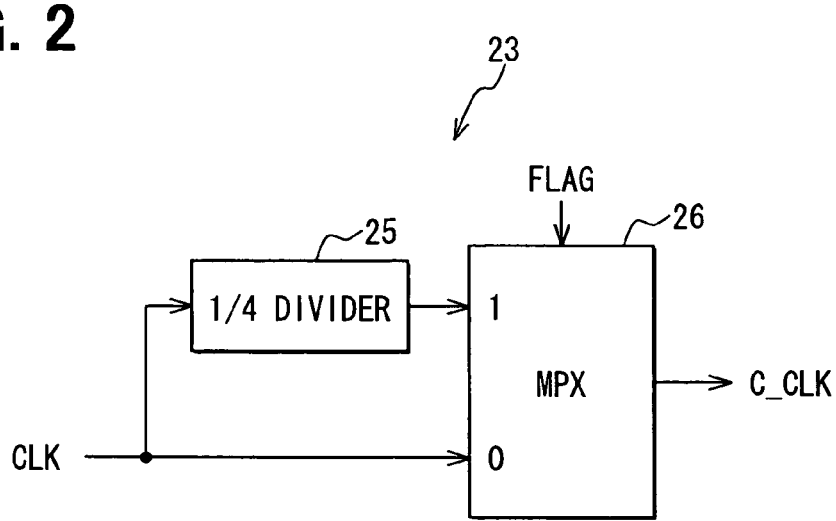
FIG. 2 is a circuit diagram of a clock divider circuit of FIG. 1.

The clock divider circuit 23 supplies a clock signal C_CLK to the CPU 12. As shown in FIG. 2, the clock divider circuit 23 includes a ¼-divider circuit 25 for dividing a frequency of the clock signal CLK by four and a multiplexer (MPX) 26. For example, when the clock signal CLK has a frequency of 16 MHz, the ¼-divider circuit 25 outputs a ¼-clock signal having a frequency of 4 MHz. The clock signal CLK and the ¼-clock signal are supplied to input terminals of the MPX 26. When the voltage drop detection flag is set, the MPX 26 outputs the clock signal CLK having the frequency of 16 MHz as the clock signal C_CLK. In contrast, when the voltage drop detection flag is not set, the MPX 26 outputs the ¼-clock signal having the frequency of 4 MHz as the clock signal C_CLK.

Figure 3:
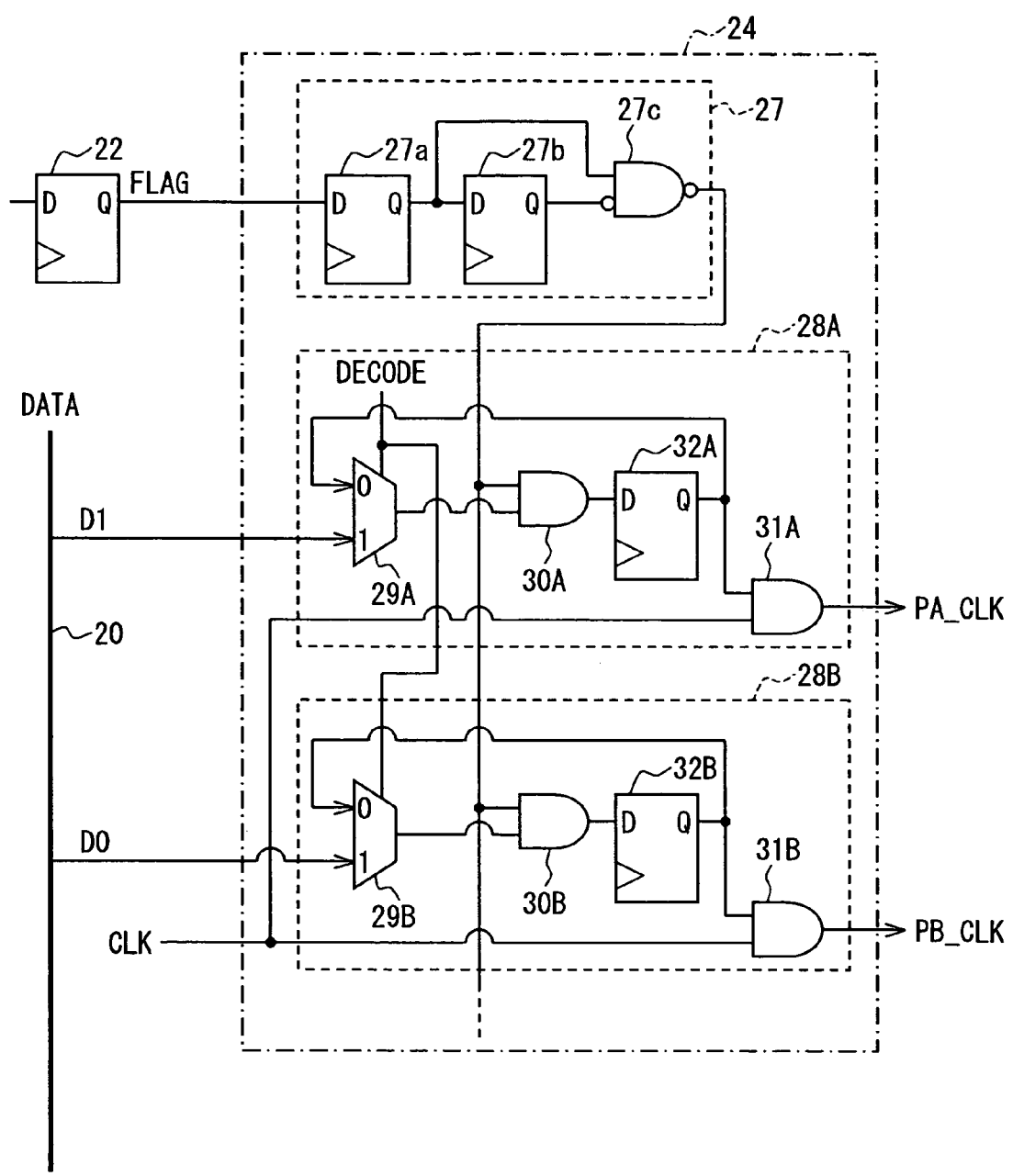
FIG. 3 is a circuit diagram of a peripheral clock control circuit of FIG. 1.

As shown in FIG. 3, the peripheral clock control circuit 24 includes a flag-leading edge detector 27 and clock enable controllers 28A, 28B.

The flag-leading edge detector 27 has a flip-flop 27a, a flip-flop 27b cascaded with the flip-flop 27a, and a NAND-gate 27c having one inverted input and one non-inverted input.

The voltage drop detection flag is supplied from the flip-flop 22 to an input D of the flip-flop 27a. Outputs Q of the flip-flops 27a, 27b are connected to the non-inverted input and the inverted input of the NAND-gate 27c, respectively. Including the flip-flops 27a, 27b, flip-flops described in the embodiment are operated in synchronization with the clock signal C_CLK.

The clock enable controllers 28A, 28B have the same configuration. The clock enable controller 28A includes a MPX 29A, AND-gates 30A, 31A, and a flip-flop 32A. Likewise, the clock enable controller 28B includes a MPX 29B, AND-gates 30B, 31B, and a flip-flop 32B.

The MPX 29A has one input connected to a data bit line D1 of a data bus 20 and an output connected to one input of the AND-gate 30A whose output is connected to an input D of the flip-flop 32A. Likewise, the MPX 29B has one input connected to a data bit line D0 of a data bus 20 and an output connected to one input of the AND-gate 30B whose output is connected to an input D of the flip-flop 32B. The data bit line D0 is the least significant bit line of the data bus 20.

The other inputs of the AND-gates 30A, 30B are connected to an output of the NAND-gate 27c of the flag-leading edge detector 27. An output Q of the flip-flop 32A is connected to the other input of the MPX 29A and one input of the AND-gate 31A. Likewise, an output Q of the flip-flop 32B is connected to the other input of the MPX 29B and one input of the AND-gate 31B. The clock signal CLK is supplied to the other inputs of the AND-gates 31A, 31B.

When the CPU 12 outputs a predetermined address corresponding to the MPXs 29A, 29B on the address bus 19, an address decoder (not shown) decodes the address and outputs a decode signal to the MPXs 29A, 29B. When the MPXs 29A, 29B receive the decode signal, the MPXs 29A, 29B switches to the data bit lines D1, D0, respectively.

The MPXs 29A, 29B select the flip-flop 32A, 32B to allow the flip-flop 32A, 32B to hold data while receiving no decode signal. When the CPU 12 outputs data on the data bit lines D1, D0 of the data bus 20 while the flag-leading edge detector 27 detects no leading edge of the voltage drop detection flag, the MPXs 29A, 29B switches to the data bit lines D1, D0 and the data is written into the flip-flop 32A, 32B.

Figure 4:
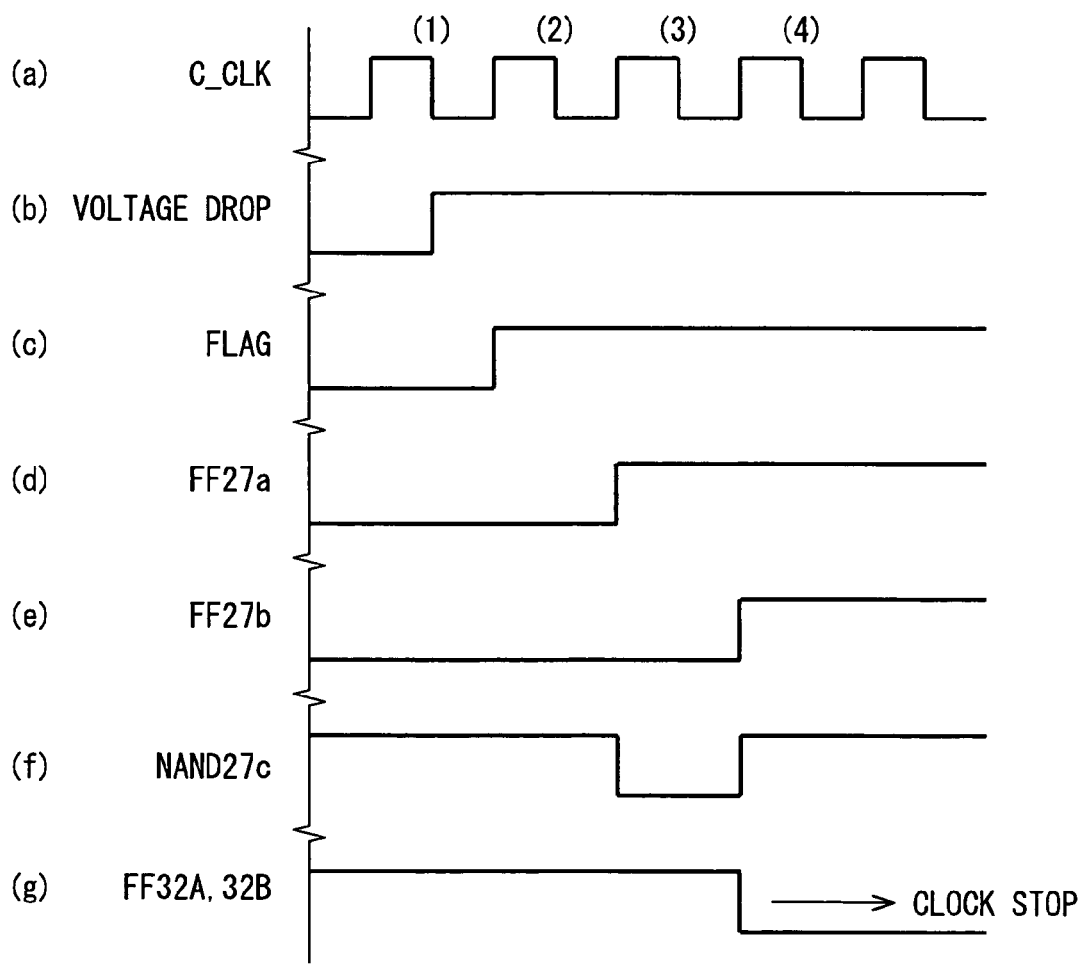
FIG. 4 is a timing diagram illustrating operations of the peripheral clock control circuit of FIG. 3.

FIG. 4 is a timing diagram illustrating operations performed in the peripheral clock control circuit 24.

(a) The clock signal C_CLK is supplied to the flip-flop 22.

(b) The drop in the power supply voltage Vcc is detected in a cycle (1) of the clock signal C_CLK.

(c) The voltage drop detection flag is set in synchronization with a leading edge of a cycle (2) of the clock signal C_CLK.

(d) The output of the flip-flop 27*a* of the flag-leading detector 27 changes to high level in synchronization with a leading edge of a cycle (3) of the clock signal C_CLK, because the voltage drop detection flag is set.

(f) The inverted input and the non-inverted input of the NAND-gate 27*c* of the flag-leading edge detector 27 become low level and high level, respectively. The output of the NAND-gate 27*c* changes to low level in synchronization with the leading edge of the cycle (3) of the clock signal C_CLK.

(e) The output Q of the flip-flop 27*b* of the flag-leading edge detector 27 changes to high level in synchronization with a leading edge of a cycle (4) of the clock signal C_CLK.

(f) The output of the NAND-gate 27*c* changes to high level in synchronization with the leading edge of the cycle (4). Thus, the output of the NAND-gate 27*c* is held at low level only during the cycle (3), i.e. one cycle.

(g) The AND-gates 30A, 30B receive the low level signal from the NAND-gate 27*c* and output low level signal to the flip-flops 32A, 32B, respectively. Therefore, the outputs Q of the flip-flops 32A, 32B are held at low level after the cycle (3).

Thus, the AND-gates 31A, 31B stop the supply of the clock signal CLK (i.e., PA_CLK, PB_CLK) to the peripheral circuits 14, 15, respectively.

Operations of the microcomputer 11 are described below with further reference to FIG. 5.

When the voltage drop detection circuit 17 does not detect the drop in the power supply voltage Vcc, the NAND-gate 27*c* outputs high level so that the flip-flops 32A, 32B holds a data value of 1 that is preset by the CPU 12. Therefore, the clock signals PA_CLK, PB_CLK are supplied to the peripheral circuits 14, 15 through the AND-gates 31A, 31B, respectively.

Figure 5:
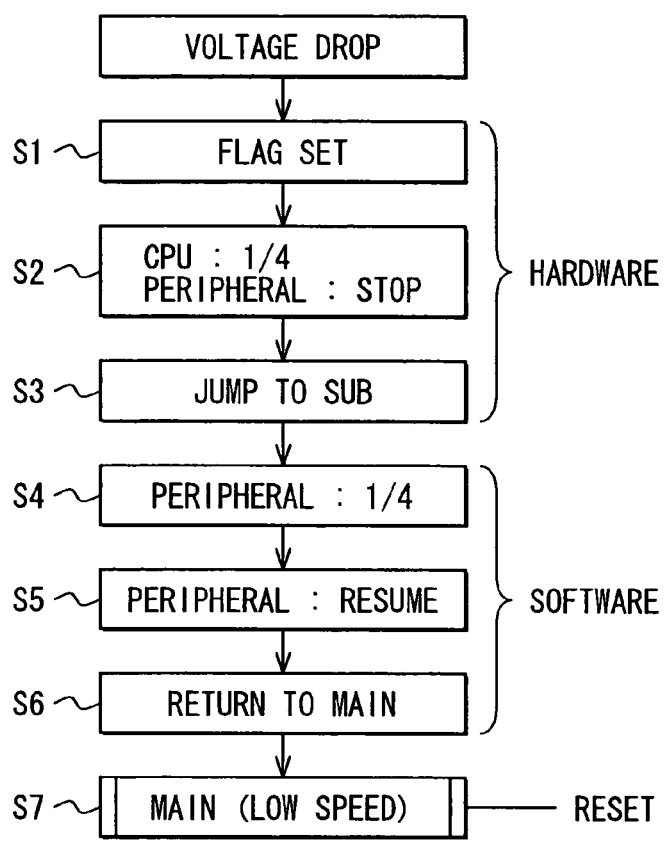
FIG. 5 is a flow diagram illustrating steps performed by the microcomputer of FIG. 1.

FIG. 5 is a flow diagram of a process performed when the voltage drop detection circuit 17 detects the drop in the power supply voltage Vcc. This process includes a hardware process and a software process (subroutine program 13*a*) executed by the CPU 12.

The process begins at step S1, where the voltage drop detection flag is set.

Then, the process proceeds to step S2, where the MPX 26 of the clock divider circuit 23 switches to the ¼-divider circuit 25. Consequently, the ¼-clock signal is supplied to the CPU 12. In the peripheral clock control circuit 24, as described above, the supply of the clock signals PA_CLK, PB_CLK to the peripheral circuits 14, 15 are stopped.

The interrupt control circuit 18 outputs the interrupt request to the CPU 12 and sends the interrupt vector to the CPU 12. The interrupt vector points to a starting address of the subroutine program 13*a*.

Then, the process proceeds to step S3, where the CPU 12 jumps to the starting address and executes the subroutine program 13*a*. Therefore, the hardware process ends at step S3, and the software process starts at step S4.

Then, the process proceeds to step S4, where the CPU 12 resets the frequency division ratio of the divider circuit of the peripheral circuit 15 in order that the frequency ratio of the clock signal PB_CLK to the carrier of the PMW signal can be set to 4 to 1.

Then, the process proceeds to step S5, where the supply of the clock signal PB_CLK to the peripheral circuit 15 is resumed by writing a data value of 1 into the flip-flop 32B.

Then, the process proceeds to step S6, where the subroutine program 13*a* ends and the CPU 12 returns to the main program. Thus, whereas the peripheral circuit 14 remains stopped due to no supply of the clock signal PA_CLK, the peripheral circuit 15 is operated at low speed.

In the microcomputer 11 according to the first embodiment, the peripheral circuit 14 is the communication circuit. Therefore, even if the peripheral circuit 14 is operated at low speed, synchronization between the peripheral circuit 14 and a device communicated with the peripheral circuit 14 cannot be achieved. For that reason, the peripheral circuit 14 remains stopped.

Then, the process proceeds to step S7, where the CPU 12 executes the main program at low speed based on the ¼-clock signal. In this condition, when the power supply voltage Vcc returns to a normal level, the voltage drop detection circuit 17 turns the voltage drop detection signal from active to inactive, thereby resetting the voltage drop detection flag. A reset circuit 34 resets the microcomputer 11 in response to a falling edge of the voltage drop detection flag. The falling edge of the voltage drop detection flag is detected by a flag-falling edge detector (not shown). For example, the flag-falling detector has a configuration similar to that of the flag-leading edge detector 27. The flag-falling edge detector includes a first flip-flop connected to the flip-flop 22 and a second flip-flop cascaded with the first flip-flop. The flag-falling detector is configured such that the flag-falling edge detector outputs a flag falling signal (high or low) to the reset circuit 34, when an output of the first flip-flop is low and an output of the second flip-flop is high.

Thus, the microcomputer 11 is reset. Accordingly, the clock circuit 16 is initialized so that the supply of the clock signal returns to normal condition.

According to the first embodiment, the microcomputer 11 has the ROM 13 storing the subroutine program 13*a* for causing the CPU 12 to execute the clock control process. When the voltage drop detection circuit 17 detects the drop in the power supply voltage Vcc at the end portion of the power line 21, the frequency of the clock signal C_CLK provided through the clock circuit 16 to the CPU 12 is divided down. At the same time, the supply of the clock signals PA_CLK, PB_CLK provided to the peripheral circuits 14, 15 are stopped. Then, the CPU 12 executes the subroutine program 13*a*, thereby resuming the supply of the clock signal PB_CLK provided to the peripheral circuit 15.

In the microcomputer 11, therefore, when the drop in the power supply voltage Vcc is detected, power consumption can be reduced by dividing down the frequency of the clock signal C_CLK and by stopping the supply of the clock signals PA_CLK, PB_CLK. Because the supply of the clock signals PA_CLK, PB_CLK can be selectively resumed, it is possible to selectively operate the peripheral circuits 14, 15 based on their respective functions. Because the voltage drop detection circuit 17 is disposed at the end portion of the power line 3, it is possible to ensure the speed margin for the peripheral circuit 15 that is disposed at the end portion of the power line 3.

Further, when the CPU 12 resumes the supply of the clock signal PB_CLK provided to the peripheral circuit 15 based on the subroutine program 13*a*, the PWM signal generated by the peripheral circuit 15 is divided down by the frequency division ratio set by the CPU 12. By selectively setting the frequency division ratio, therefore, it is possible to operate the peripheral circuit 15 at a desired operation speed after the resumption.

When the voltage detection circuit detects the drop in the power supply voltage Vcc, the MPX 26 of the clock divide circuit 23 of the clock circuit 16 switches to the ¼-divider circuit 25, thereby providing the ¼ clock signal to the CPU 12. Therefore, very simple hardware can implement the process for dividing down the clock signal C_CLK provided to the CPU 12.

When the voltage detection circuit detects the drop in the power supply voltage Vcc, the interrupt control circuit 18 outputs the interrupt request to the CPU 12. Then, when the interrupt request is enabled, the interrupt control circuit 18 outputs the interrupt vector pointing to the starting address of the subroutine program 13a to the CPU 12. Therefore, very simple hardware can implement the process for causing the CPU 12 to execute the subroutine program 13a.

Second Embodiment

A microcomputer 41 of the second embodiment will be now described with reference to FIG. 6 and FIG. 7.

The microcomputer 41 has a configuration basically similar to the microcomputer 11 of the first embodiment. Differences between the microcomputer 11 and the microcomputer 41 are that the microcomputer 41 includes a peripheral clock control circuit 42 instead of the peripheral clock control circuit 24 and the ROM 13 of the microcomputer 41 stores a subroutine program 13b instead of the subroutine program 13a. As shown in FIG. 6, the subroutine program 13b is slightly modified from the subroutine program 13a.

Figure 7:
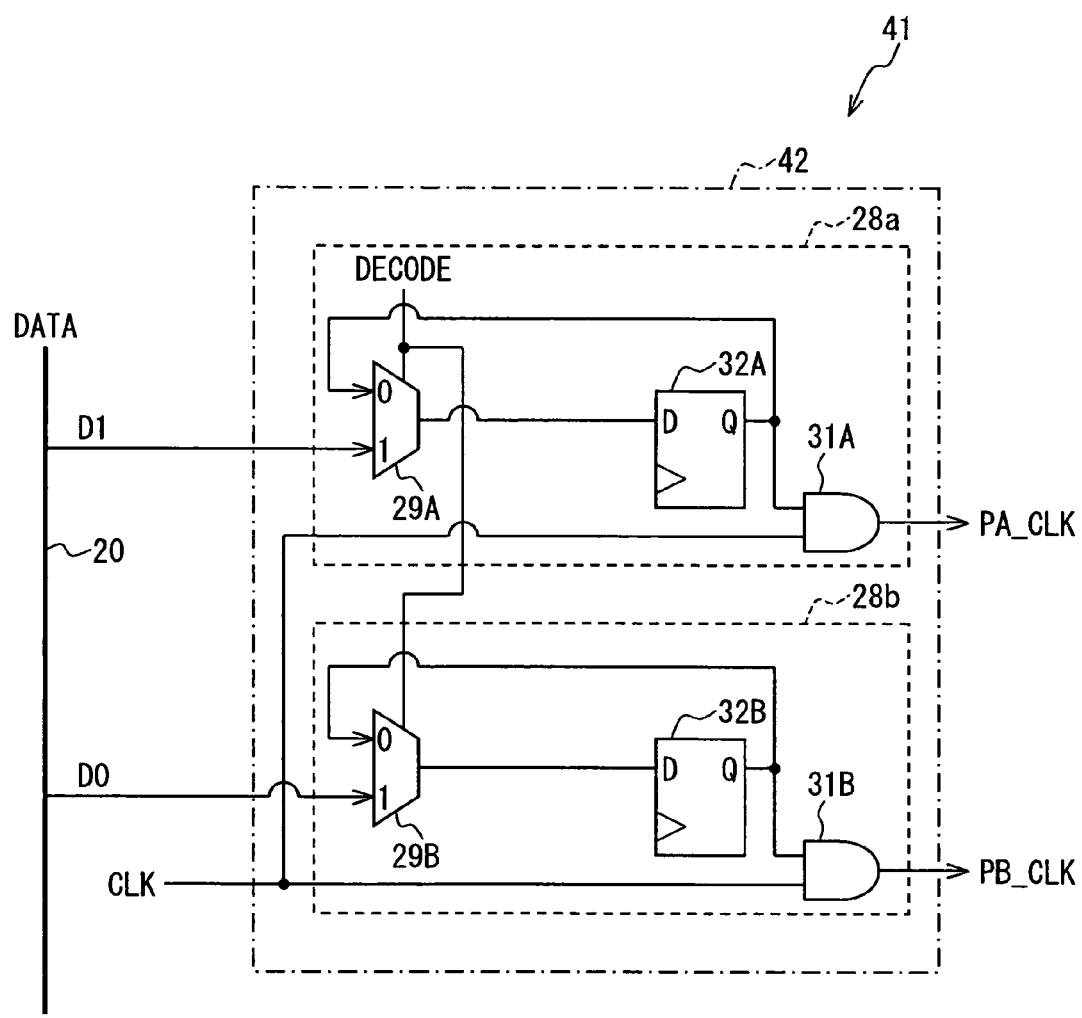
FIG. 7 is a circuit diagram of a peripheral clock control circuit of the second embodiment.

FIG. 7 is a circuit diagram of the peripheral clock control circuit 42. The peripheral clock control circuit 42 has no NAND-gate 27. Accordingly, clock enable controllers 28a, 28b of the peripheral clock control circuit 42 has no AND-gates 30A, 30B of the clock enable controllers 28A, 28B, respectively. The outputs of the MPX 29A, 29B are directly connected to the inputs D of the flip-flops 32A, 32B, respectively.

Operations of the microcomputer 41 are described below.

Figure 6:
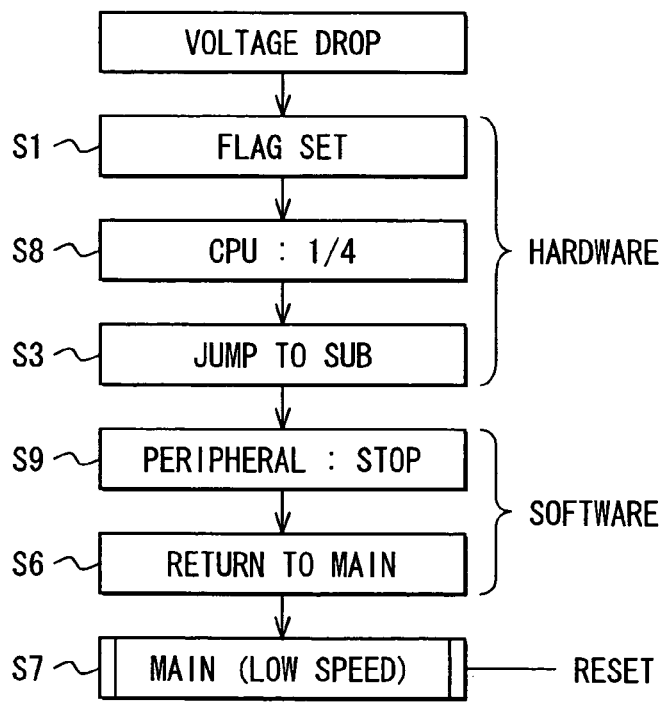
FIG. 6 is a flow diagram illustrating steps performed by a microcomputer according to a second embodiment.

FIG. 6 is a flow diagram of a process performed when the voltage drop detection circuit 17 detects the drop in the power supply voltage Vcc. In the process shown in FIG. 6, step S4 of FIG. 5 is eliminated and steps S2, S3 of FIG. 5 are replaced with steps S8, S9, respectively.

The process begins at step S1, where the voltage drop detection flag is set.

Then, the process proceeds to step S8, where the frequency of the clock signal C_CLK provided to the CPU 12 is divided down by four. However, the supply of the clock signals PA_CLK, PB_CLK provided to the peripheral circuits 14, 15 is continued, respectively.

Then, the process proceeds to step S3, where the CPU 12 jumps to the subroutine program 13b.

Then, the process proceeds to step S9, where a data value of 0 is written into the flip-flop 32A of the clock enable controller 28A in order to stop the supply of the clock signal PA_CLK provided to the peripheral circuit 14. The following processes of the second embodiment are the same as the first embodiment. In the microcomputer 41, therefore, when the drop in the power supply voltage Vcc is detected, the peripheral circuit 14 stops its operation and the peripheral circuit 15 continues its operation (but, the frequency of the carrier of the PMW signal is not divided down).

As described above, according to the second embodiment, when the voltage drop detection circuit 17 detects the drop in the power supply voltage Vcc, the frequency of the clock signal C_CLK provided to the CPU 12 is divided down by four and then the CPU 12 executes the subroutine program 13b. Based on the subroutine program 13b, the CPU 12 selectively stops the supply of the clock signal PA_CLK provided to the peripheral circuit 14. Thus, the subroutine program 13b can determine whether the peripheral circuits 14,15 are operated when the drop in the power supply voltage Vcc occurs.

Third Embodiment

Figure 8:
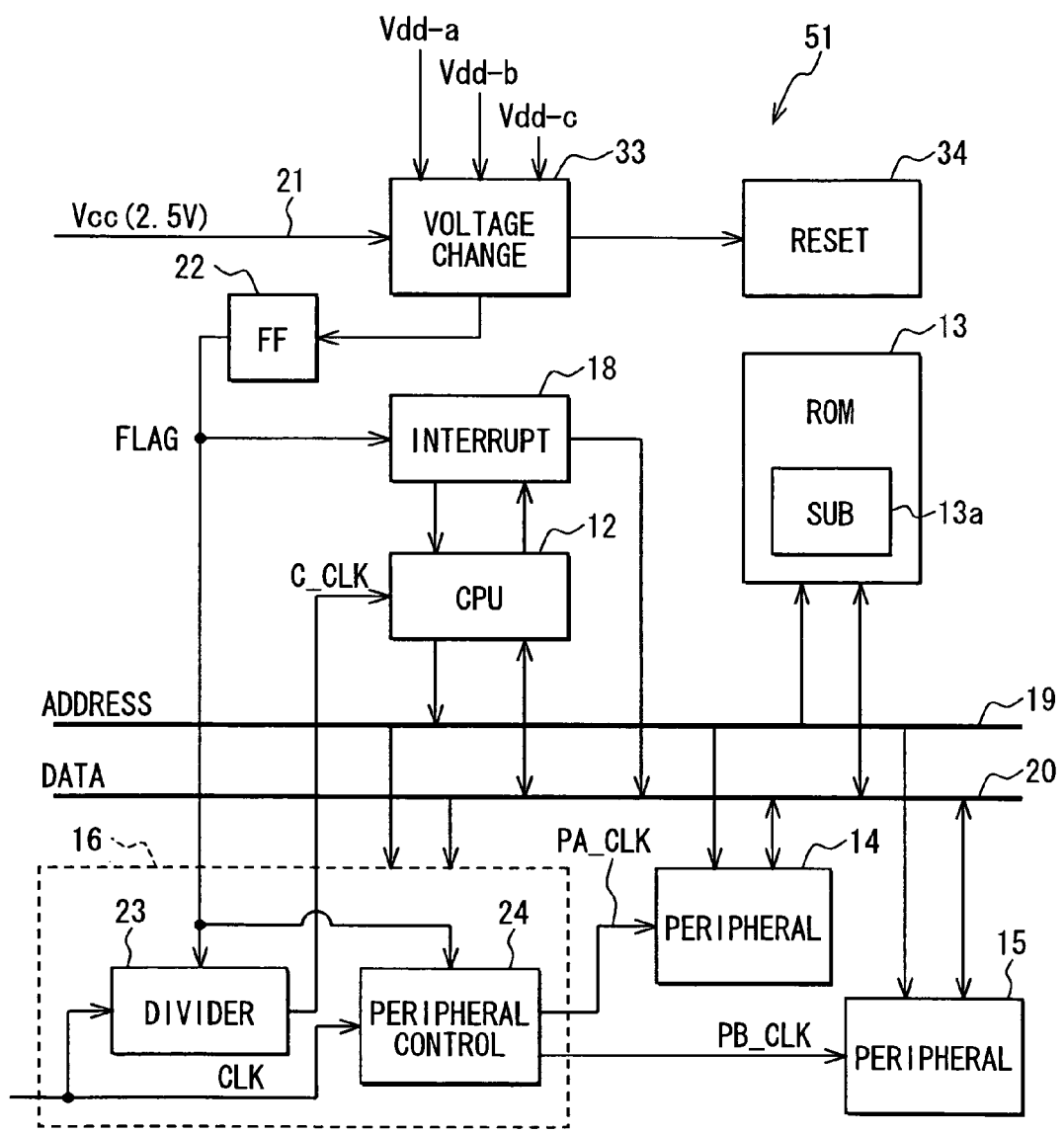
FIG. 8 is a circuit diagram of a microcomputer according to a third embodiment.

A microcomputer 51 of the third embodiment will be now described with reference to FIG. 8 and FIG. 9.

The microcomputer 51 has a configuration basically similar to that of the microcomputer 11 of the first embodiment. A difference is that the microcomputer 51 includes a voltage change detection circuit 33 instead of the voltage drop detection circuit 17.

The voltage change detection circuit 33 monitors the power supply voltage Vcc (e.g., 2.5 V). When the voltage change detection circuit 33 detects that the power supply voltage Vcc drops below a reference power source Vdd-a (e.g., 2.3 V), a reference voltage Vdd-b (e.g., 2.2 V), and a reference voltage Vdd-c (e.g., 2.1 V) within a predetermined time period, the voltage change detection circuit 33 outputs a voltage change detection signal showing that the power supply voltage Vcc changes significantly relative to the time period.

Two or more reference power sources are required. The reference power source may have a voltage higher than the power supply voltage Vcc and detect that the power supply voltage Vcc increases significantly relative to the time period.

Figure 9:
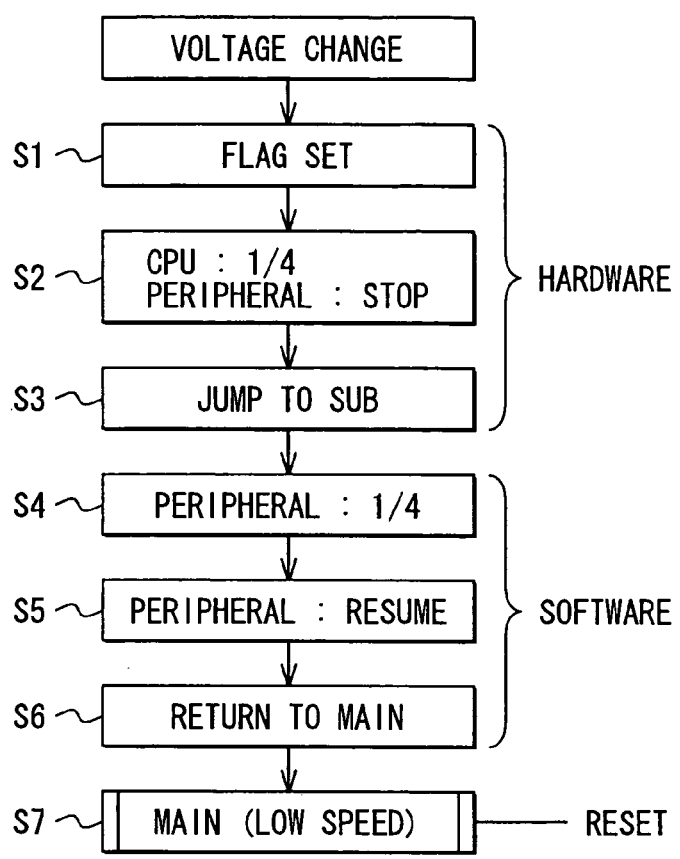
FIG. 9 is a flow diagram illustrating steps performed by the microcomputer of FIG. 8.

As shown in FIG. 9, operations of the microcomputer 51 are basically similar to that of the microcomputer 11 of the first embodiment. A difference is that a voltage change detection flag is set at step S1 instead of the voltage drop detection flag.

Fourth Embodiment

Figure 10:
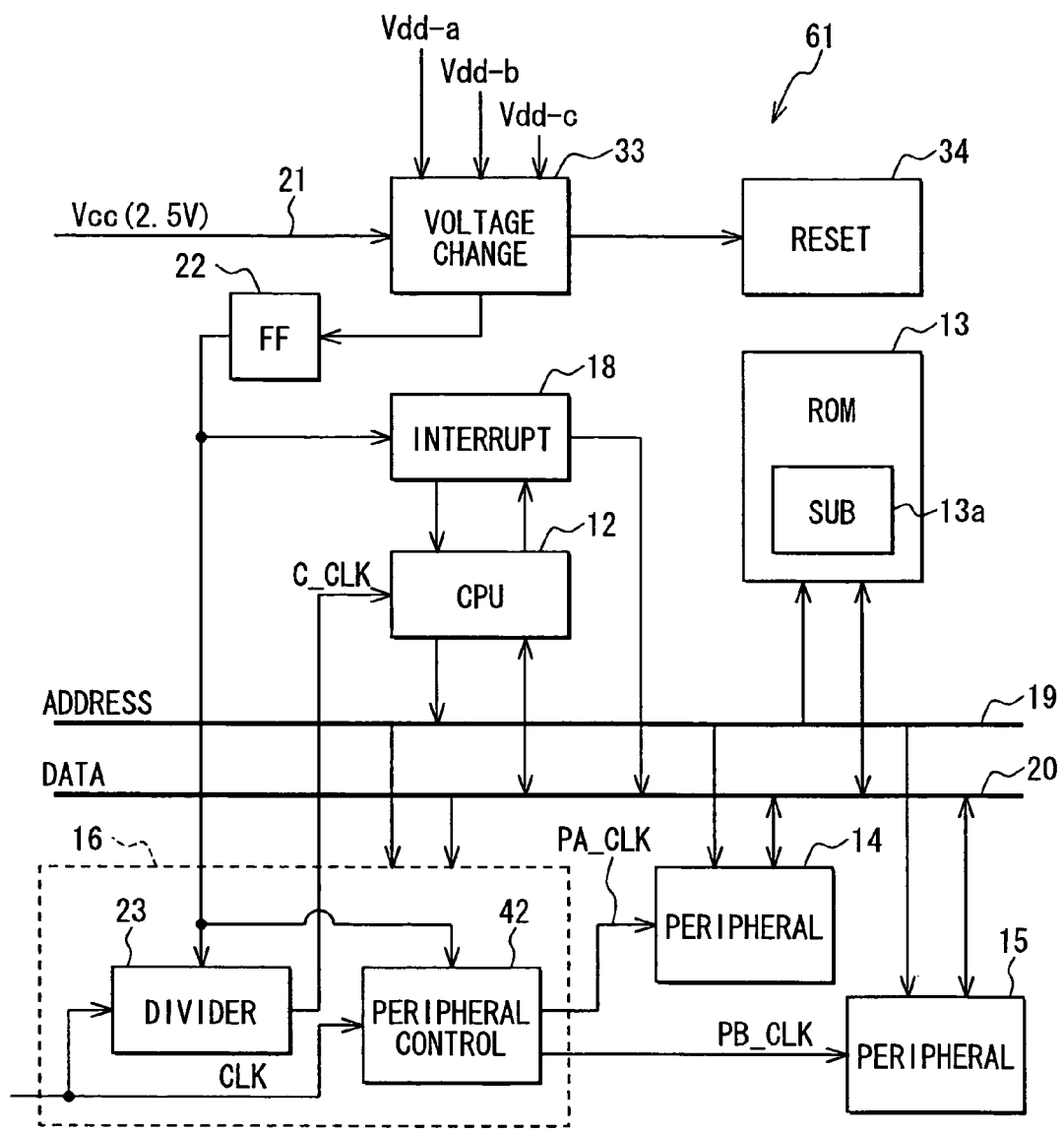
FIG. 10 is a circuit diagram of a microcomputer according to a fourth embodiment.

A microcomputer 61 of the fourth embodiment will be now described with reference to FIG. 10 and FIG. 11.

The microprocessor 61 has a configuration similar to that of the microcomputer 51 of the third embodiment. A difference is that the microprocessor 61 includes the peripheral clock control circuit 42 instead of the peripheral clock control circuit 24. Therefore, a difference between the third embodiment and the fourth embodiment is the same as the difference between the first embodiment and the second embodiment.

Figure 11:
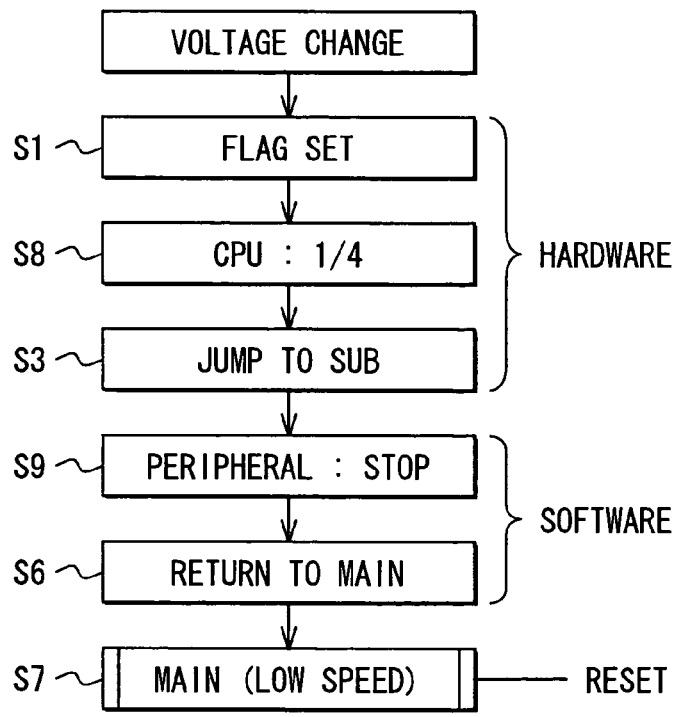
FIG. 11 is a flow diagram illustrating steps performed by the microcomputer of FIG. 10.

As shown in FIG. 11, operations of the microcomputer 61 are basically similar to that of the microcomputer 41 of the second embodiment. A difference is that the voltage change detection flag is set at step S1 instead of the voltage drop detection flag.

Fifth Embodiment

Figure 12:
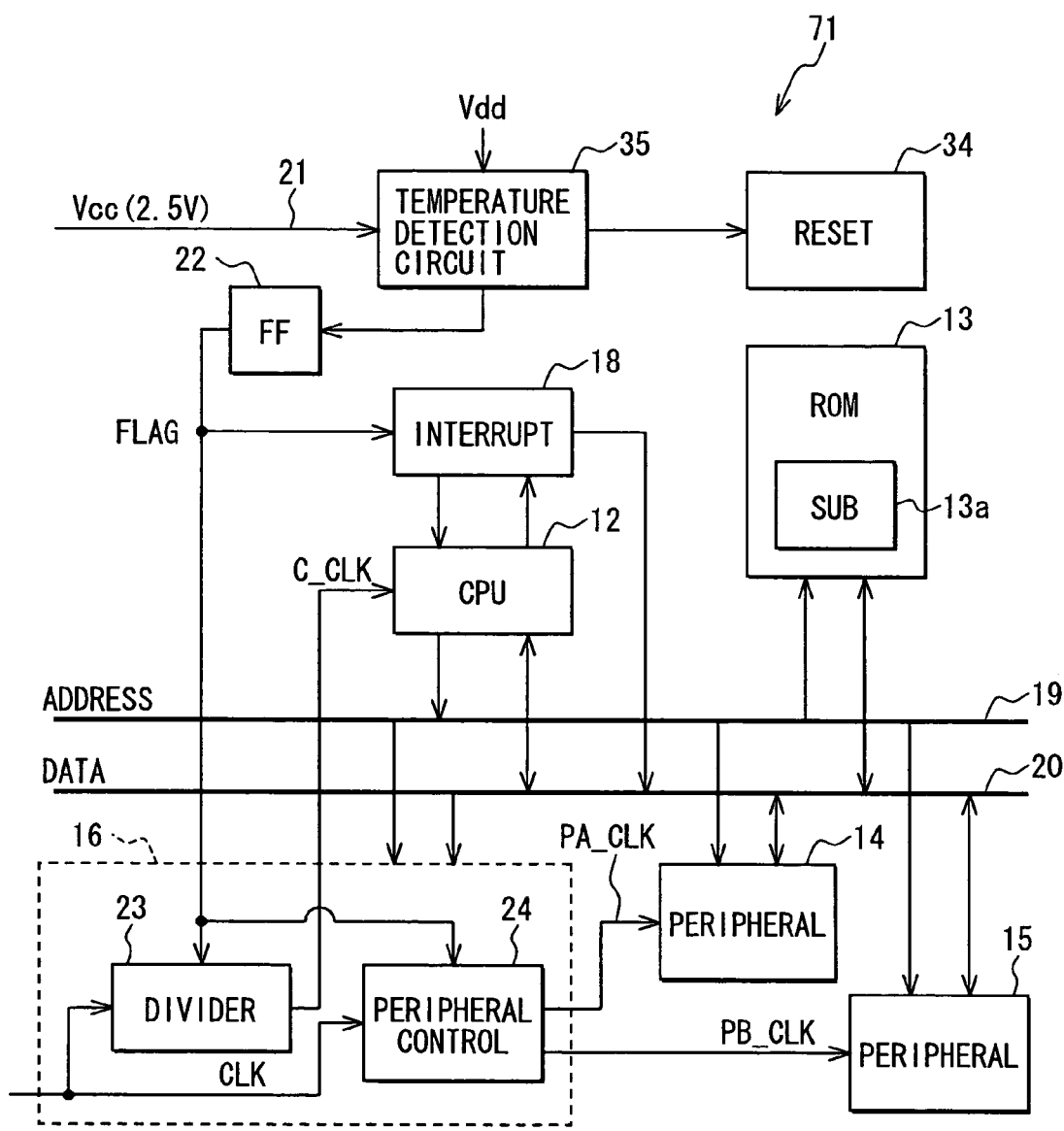
FIG. 12 is a circuit diagram of a microcomputer according to a fifth embodiment.

A microcomputer 71 of the fifth embodiment will be now described with reference to FIG. 12 and FIG. 13.

The microcomputer 71 has a configuration basically similar to that of the microcomputer 11 of the first embodiment. A difference is that the microcomputer 71 includes a temperature detection circuit 35 instead of the voltage drop detection circuit 17.

The temperature detection circuit 35 has a diode through which a constant current flows. The temperature detection circuit 35 monitors a voltage Vdd of the diode, calculates temperature using voltage-temperature characteristics of the diode and outputs a temperature detection signal when the temperature exceeds a predetermined range.

Figure 13:
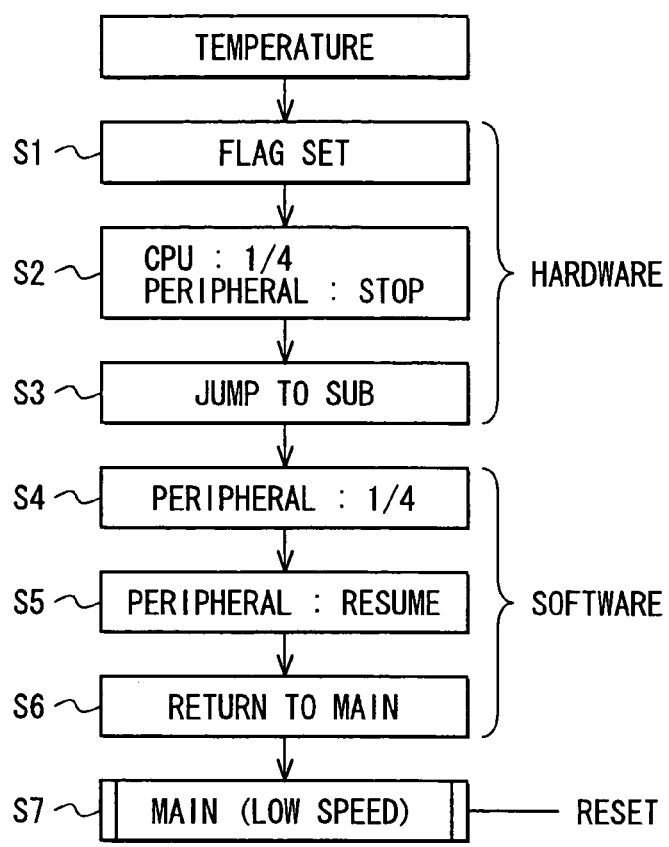
FIG. 13 is a flow diagram illustrating steps performed by the microcomputer of FIG. 12.

As shown in FIG. 13, operations of the microcomputer 71 are basically similar to that of the microcomputer 11 of the first embodiment. A difference is that a temperature detection flag is set at step S1 instead of the voltage drop detection flag.

Sixth Embodiment

Figure 14:
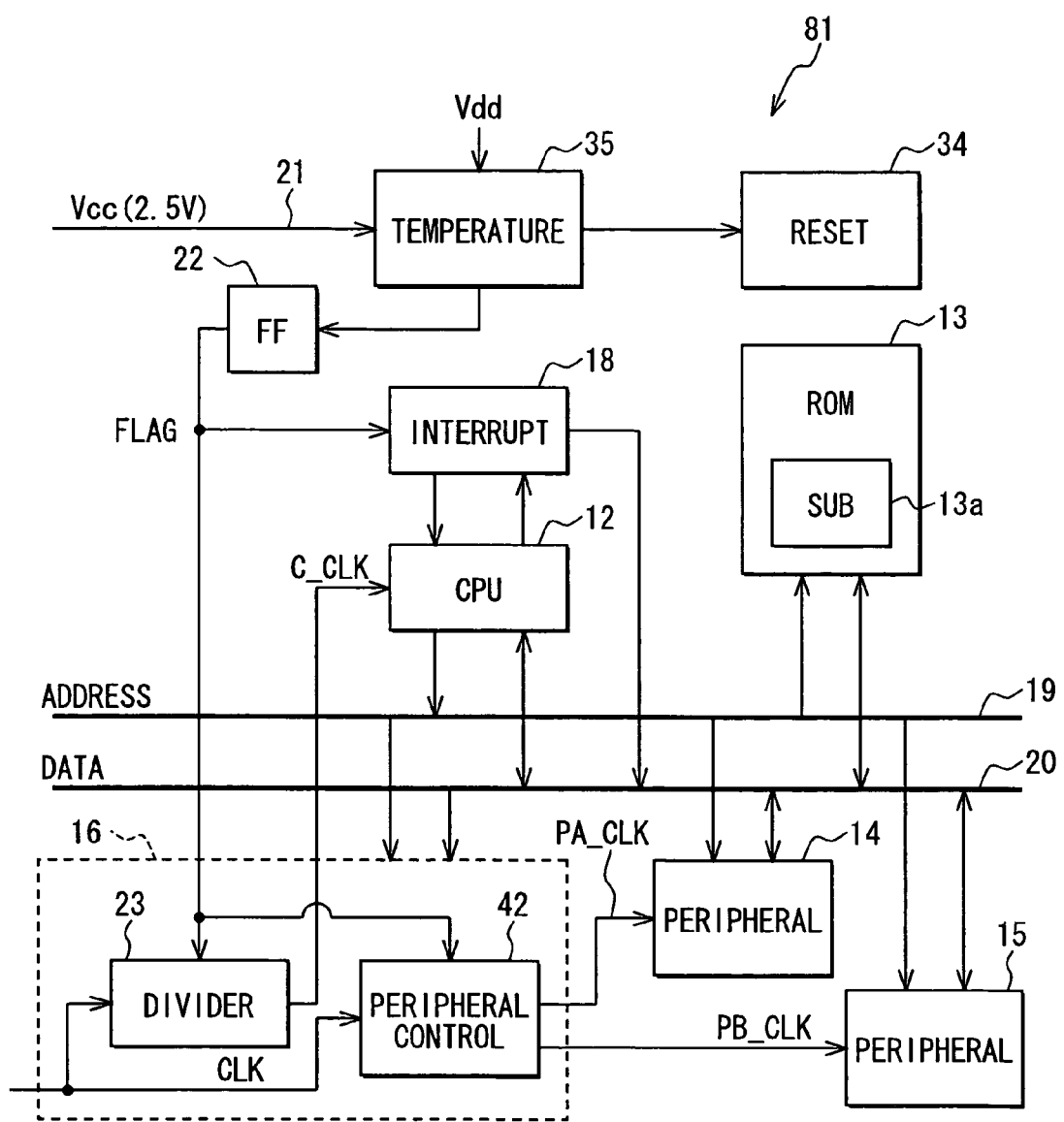
FIG. 14 is a circuit diagram of a microcomputer according to a sixth embodiment.

A microcomputer 81 of the sixth embodiment will be now described with reference to FIG. 14 and FIG. 15.

The microprocessor 81 has a configuration basically similar to that of the microcomputer 71 of the fifth embodiment. A difference is that the microprocessor 81 includes the peripheral clock control circuit 42 instead of the peripheral clock control circuit 24. Therefore, a difference between the fifth embodiment and the sixth embodiment is the same as the difference between the first embodiment and the second embodiment.

Figure 15:
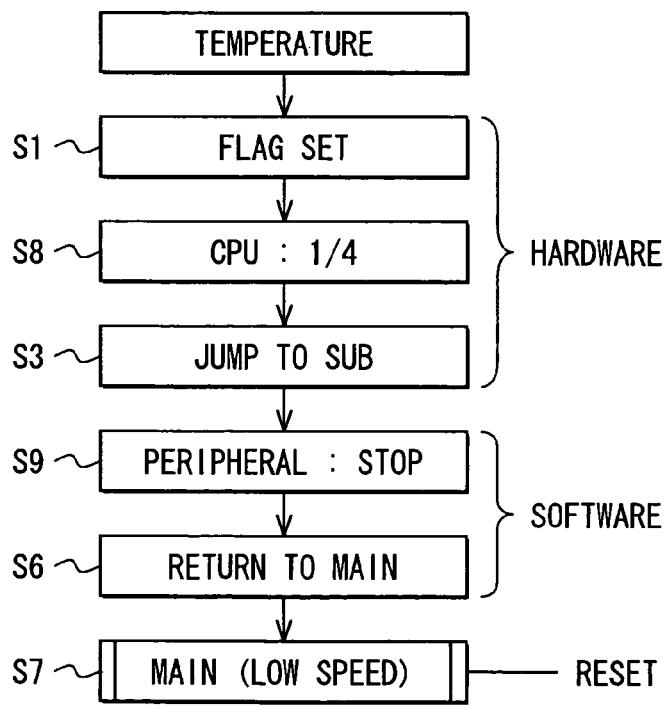
FIG. 15 is a flow diagram illustrating steps performed by the microcomputer of FIG. 14.

As shown in FIG. 15, operations of the microcomputer 81 are basically similar to that of the microcomputer 41 of the second embodiment. A difference is that the temperature detection flag is set at step S1 instead of the voltage drop detection flag.

Seventh Embodiment

Figure 16:
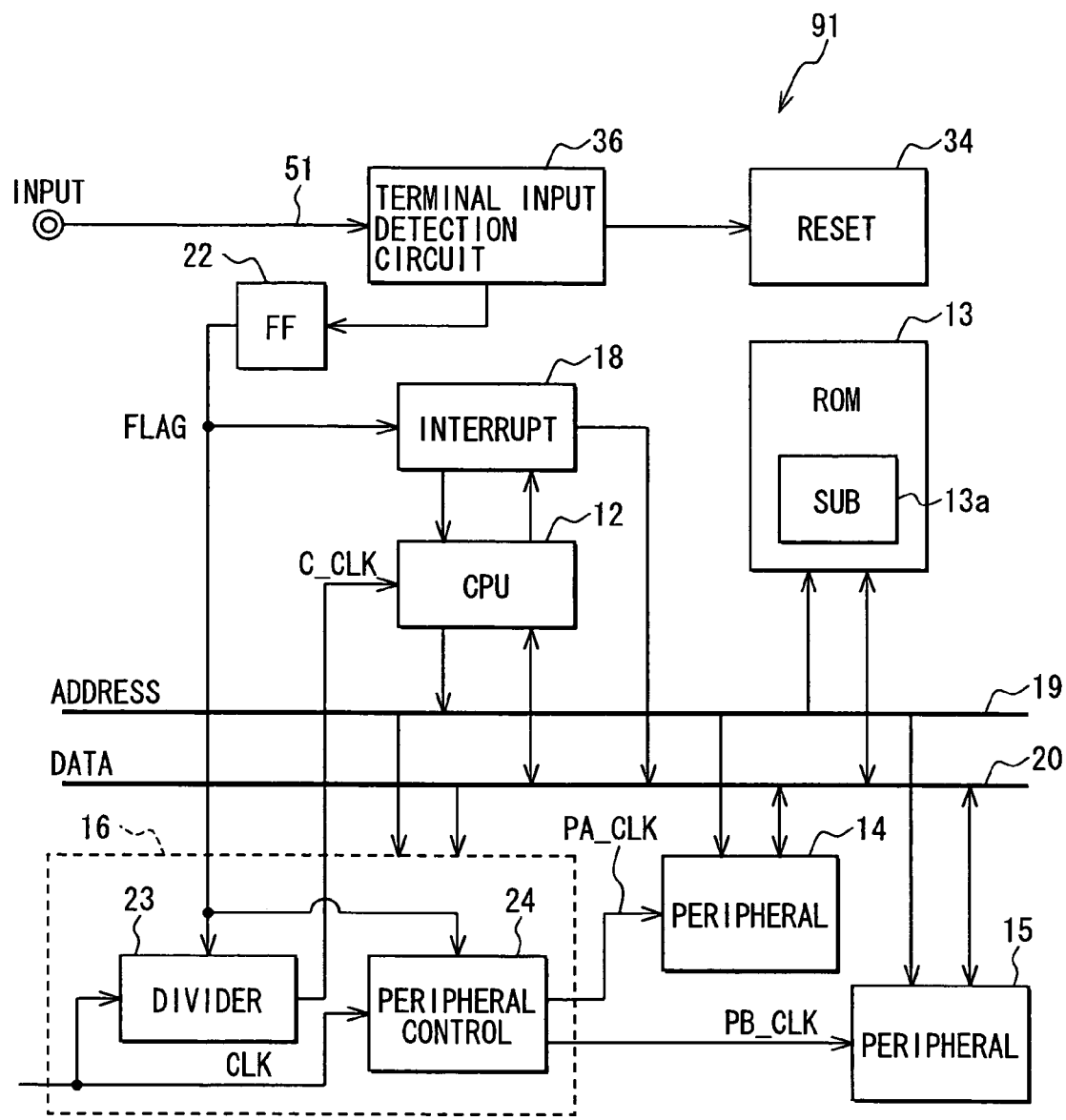
FIG. 16 is a circuit diagram of a microcomputer according to a seventh embodiment.

A microcomputer 91 of the seventh embodiment will be now described with reference to FIG. 16 and FIG. 17.

The microcomputer 91 has a configuration basically similar to that of the microcomputer 11 of the first embodiment. A difference is that the microcomputer 91 includes a terminal input detection circuit 36 instead of the voltage drop detection circuit 17.

The terminal input detection circuit 36 is connected to an input terminal of the microcomputer 91 through an input line 51 and monitors the terminal input. When the terminal input detection circuit 36 detects a predetermined detection level (high or low), the terminal input detection circuit 36 outputs a terminal input detection signal.

Figure 17:
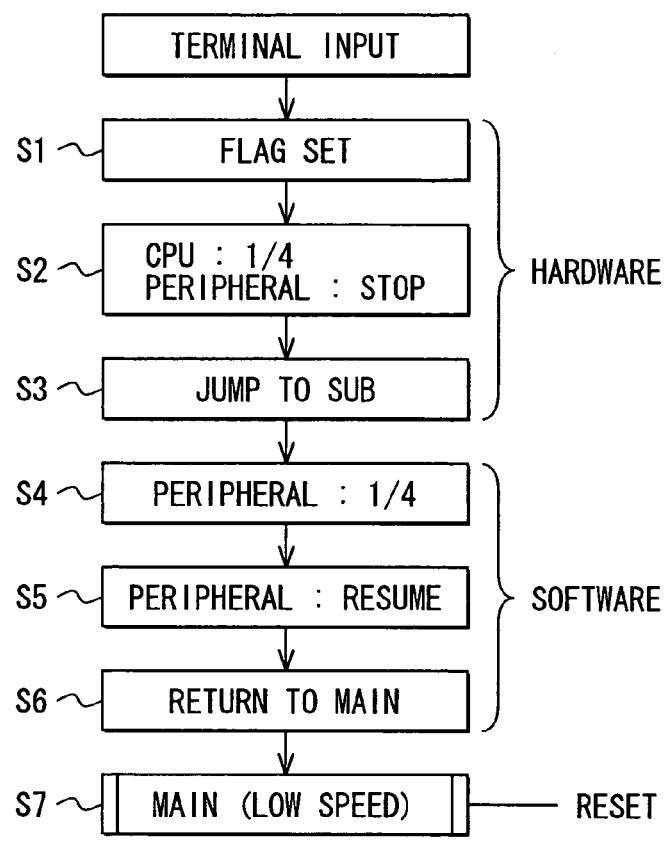
FIG. 17 is a flow diagram illustrating steps performed by the microcomputer of FIG. 16.

As shown in FIG. 17, operations of the microcomputer 91 are basically similar to that of the microcomputer 11 of the first embodiment. A difference is that a terminal input detection flag is set at step S1 instead of the voltage drop detection flag.

Eighth Embodiment

Figure 18:
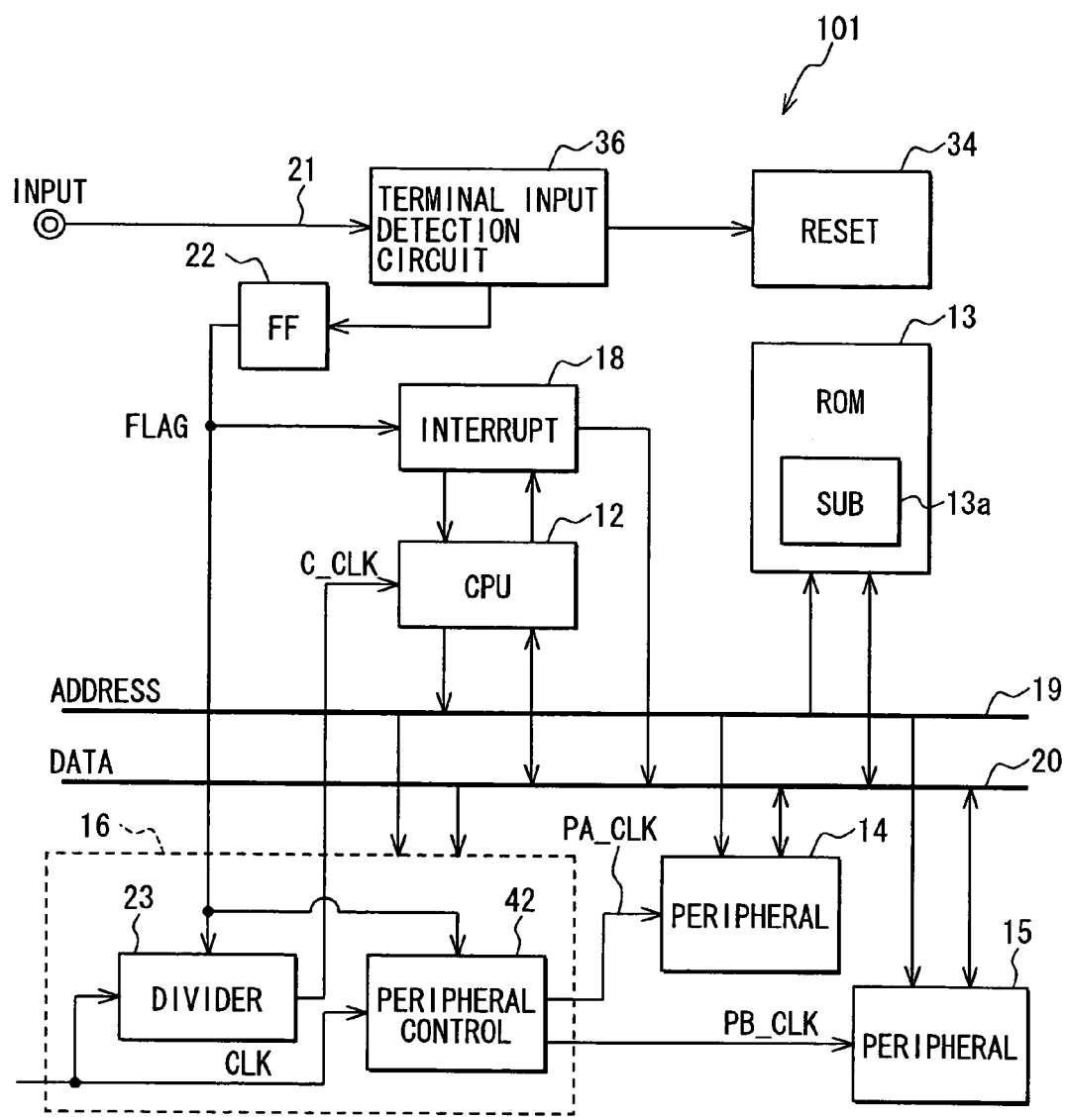
FIG. 18 is a circuit diagram of a microcomputer according to an eighth embodiment.
Figure 20:
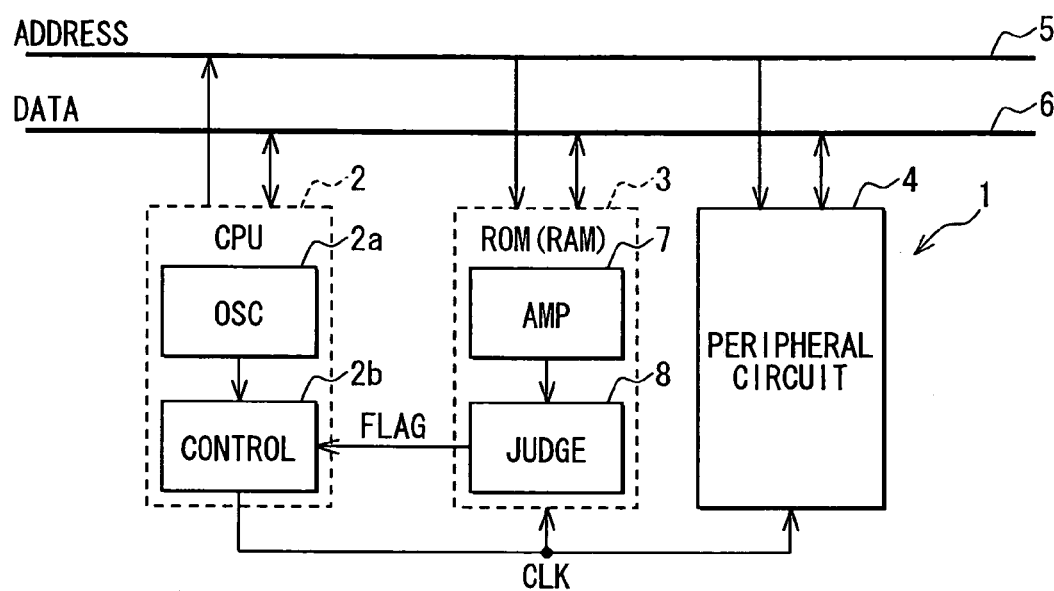
FIG. 20 is a circuit diagram of a microcomputer according to prior art.

A microcomputer 101 of the eighth embodiment will be now described with reference to FIG. 18 and FIG. 19.

The microprocessor 101 has a configuration basically similar to that of the microcomputer 91 of the seventh embodiment. A difference is that the microprocessor 101 includes the peripheral clock control circuit 42 instead of the peripheral clock control circuit 24. Therefore, a difference between the seventh embodiment and the eighth embodiment is the same as the difference between the first embodiment and the second embodiment.

Figure 19:
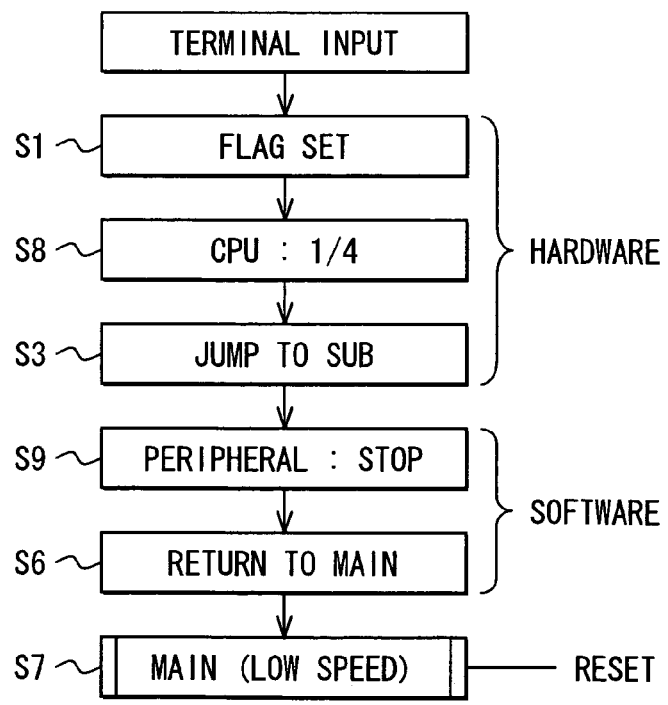
FIG. 19 is a flow diagram illustrating steps performed by the microcomputer of FIG. 18.

As shown in FIG. 19, operations of the microcomputer 101 are basically similar to that of the microcomputer 41 of the second embodiment. A difference is that the terminal input detection flag is set at step S1 instead of the voltage drop detection flag.

[Modifications]

The above embodiments may be modified in various ways.

Step S2 or step S8 may be implemented by software.

Step S4 or step S5 may be performed at step S2 by hardware. For example, a clock signal supplied to a peripheral circuit having relatively less need for continuous operation may be selectively stopped or divided down before the CPU 12 executes the subroutine program 13a. In such an approach, the subroutine program 13a may be simplified.

Step S4 may be performed in the second, fourth, sixth, eighth embodiments.

In the second, fourth, sixth, eighth embodiments, the supply of the clock signal PA_CLK to the peripheral circuit 14 may be stopped at step S8 and accordingly step S9 may be eliminated.

The microprocessors may include three or more peripheral circuits.

When the drop in the power voltage Vcc is detected, the clock signal C_CLK provided to the CPU 12 may be divided by two, or eight or more.

The level of the power supply voltage, the threshold value for detecting the power supply voltage drop and the frequency of the clock signal may be adjusted for individual design.

The microprocessors may be applied to various applications including the vehicular ECU.

Such changes and modifications are to be understood as being within the scope of the present invention as defined by the appended claims.

What is claimed is:

1. A microcomputer, comprising:
a central processing unit;
a program memory for storing a control program executed by the central processing unit;
a plurality of peripheral circuits for implementing a predetermined function;
a clock control circuit for controlling a clock signal provided to the central processing unit and the peripheral circuits;
a voltage drop detection circuit for detecting a drop in a voltage of a power source below a predetermined level, the voltage drop detection circuit being disposed at an end portion of a power line, and
an interrupt control circuit for outputting an interrupt request to the central processing unit when the voltage drop detection circuit detects the drop in the voltage below the predetermined level, wherein
the program memory further stores a subroutine program for causing the central processing unit to execute a clock control process,
when the voltage drop detection circuit detects the drop in the voltage below the predetermined level, a frequency of the clock signal provided through the clock control circuit to the central processing unit is divided down, a supply of the clock signal provided to the peripheral circuits is stopped, and the subroutine program is executed by the central processing unit,
the central processing unit, operating in accordance with the subroutine program, selectively resumes the supply of the clock signal provided to the peripheral circuits,
the central processing unit, operating in accordance with the subroutine program, selectively divides down a frequency of the clock signal provided to the peripheral circuits while resuming the supply,
the clock control circuit includes a divider circuit and a multiplexer circuit for selecting between a first path for outputting the clock signal provided to the central processing unit without frequency division and a second path for outputting the clock signal provided to the central processing unit through the divider circuit,
when the voltage drop detection circuit detects the drop in the voltage below the predetermined level, the multiplexer circuit switches to the second path, and
when the central processing unit enables the interrupt request, the interrupt control circuit outputs a interrupt vector pointing to a starting address of the subroutine program to the central processing unit.

* * * * *